Patented Apr. 26, 1966

3,248,435
POLYHALOALKYL SUBSTITUTED HALOCYCLO-
DODECADIENES
Louis Schmerling, Riverside, Ill., assignor to Universal
Oil Products Company, Des Plaines, Ill., a corporation
of Delaware
No Drawing. Filed Feb. 13, 1963, Ser. No. 258,166
6 Claims. (Cl. 260—648)

This invention relates to novel compositions of matter comprising polyhalogenated relatively high boiling hydrocarbons and to a method for the preparation thereof. More particularly, the invention is concerned with a process for preparing novel compositions of matter comprising polyhaloalkyl substituted halocyclic hydrocarbons.

It has now been discovered that novel compositions of matter may be prepared by condensing a polyhaloalkane with a non-conjugated cyclic triene in the presence of certain catalytic compositions of matter. The products thus prepared, which may be characterized generically as being polyhaloalkyl substituted halocyclic hydrocarbons, will find a wide variety of uses in the chemical field such as intermediates for the preparation of organic compounds useful as resins, plastics, pharmacetuicals, etc. In addition, it is also contemplated that compounds of the type prepared according to the process of this present invention which contain a sufficient number of chlorine atoms may be utilized as insecticides or as intermediates in the preparation of other organic compounds which are useful as insecticides, especially against houseflies.

It is therefore an object of this invention to provide a process for the condensation of a polyhaloalkane with a cyclic triene.

A further object of this invention is to prepare novel compositions of matter comprising polyhaloalkyl substituted halocyclic hydrocarbons by condensing a polyhaloalkane with a non-conjugated cyclic triene.

Taken in its broadest aspect one embodiment of this invention resides in a process which comprises condensing a polyhaloalkane with a non-conjugated cyclic triene in the presence of a free radical generating compound at a temperature at least as high as the decomposition temperature of said compound, and recovering the desired polyhalogenated higher boiling hydrocarbon.

A further embodiment of this invention is found in a process which comprises condensing a polyhaloalkane containing more than one halogen atom attached to the same carbon atom with 1,5,9-cyclododecatriene in the presence of t-butyl perbenzoate at a temperature in the range of from about 110° to about 260° C., and recovering the desired polyhaloalkyl substituted halocyclic hydrocarbon.

Yet another embodiment of this invention is found in a polyhaloalkyl substituted halocyclic hydrocarbon.

A specific embodiment of this invention resides in a process which comprises condensing one molecular proportion of carbon tetrachloride with one molecular proportion of 1,5,9-cyclododecatriene in the presence of di-t-butyl peroxide at a temperature within the range of from about 130° to about 150° C., and recovering the desired 9-chloro-10-(trichloromethyl)-1,5-cyclododecadiene.

Another specific embodiment of this invention is 9-chloro-10-(dichloromethyl)-1,5-cyclododecadiene.

Other objects and embodiments referring to alternative polyhaloalkanes and alternative cyclic trienes will be found in the following further detailed description of this invention.

As hereinbefore set forth, it has now been discovered that novel compositions of matter comprising polyhaloalkyl substituted halocyclic hydrocarbons may be prepared by condensing a polyhaloalkane with a non-conjugated cyclic triene in the presence of certain catalytic compositions of matter. Suitable cyclic trienes which may be used in the process of this invention are those which do not possess conjugated configuration include 1,4,7-cyclononatriene, 1,4,7-cyclodecatriene, 1,4,8-cyclodecatriene, 1,4,7-cycloundecatriene, 1,4,8-cycloundecatriene, 1,4,7-cyclododecatriene, 1,5,9-cyclododecatriene, etc. Of the hereinbefore set forth cycloalkatrienes, 1,5,9-cyclododecatriene which is a polymer of 1,3-butadiene is the preferred starting material due to its greater availability and relatively lesser cost. However, it is to be understood that the non-conjugated cyclic trienes are only representatives of the class of compounds which may be used and that the process of the present invention is not necessarily limited thereto.

The polyhaloalkanes which may be reacted with a non-conjugated cyclic triene of the type hereinbefore set forth in the presence of a free radical generating catalyst in accordance with the process of this invention are preferably those polyhaloalkanes containing at least three halogen atoms including at least one chlorine or bromine atom attached to the same carbon atom. Particularly useful polyhaloalkanes include polychloroalkanes containing only carbon, hydrogen and chlorine atoms such as trichloromethane (chloroform), carbon tetrachloride, 1,1,1-trichloroethane (methylchloroform), 1,1,1,2-tetrachloroethane, 1,1,1-trichloropropane, 1,1,1,2,2-pentachloroethane, hexachloroethane, 1,1,3,3-tetrachloropropane, 1,1,1,3,3-pentachloropropane 1,1,1-trichlorobutane, 1,1,1,4-tetrachlorobutane, the tri-, tetra-, penta-, etc. chloropentanes, hexanes, heptanes, octanes, nonanes, decanes, etc. The analogous bromo compounds may also be used. It is also contemplated within the scope of this invention that polyhaloalkanes containing more than one type of halogen atom may also be utilized as starting materials, said compounds including bromochloroform, 1,1,1-trichloro-2-bromoethane, 1,1,1-trichloro-2-iodoethane, 1,1,1,2-tetrachloro-2-bromopropane, 1,1,1-trichloro-2-bromopropane, 1,1,1,2-tetrachloro-2-bromopropane, 1,1,1-trichloro-2-bromopropane, 1,1,1-trichloro-4-fluoropropane, 1,1,1-trichloro-4-bromobutane, 1,1,1-trichloro-4-iodobutane, etc. In addition, the preferred haloalkanes which are utilized as starting materials in the process of this invention include chloroform, carbon tetrachloride, bromoform and carbon tetrabromide due to their relatively greater availability and lower cost. It is to be understood that the aforementioned polyhaloalkanes are only representatives of the class of compounds which may be used and that the present invention is not necessarily limited thereto. It is to be also understood that the results which are obtained when utilizing the various haloalkanes hereinbefore set forth are not necessarily equivalent.

The catalysts that may be used in the process of the present invention are those which are capable of forming free radicals under the reaction conditions. These include diazonium compounds, metal alkyls, and peroxy compounds. Peroxy compounds contain the bivalent radical —O—O— which decomposes to form free radicals which initiate the general reaction of the present invention. Examples of such peroxy compounds are the persulfates, perborates and percarbonates of the alkali metals and of ammonium, peracetic acid, persuccinic acid, dimethyl peroxide, diethyl peroxide, di-tert-butyl peroxide, dipropyl peroxide, acetyl peroxide, propionyl peroxide, butyryl peroxide, lauroyl peroxide, benzoyl peroxide, tetraline peroxide, urea peroxide, tert-butyl perbenzoate, tert-butyl hydroperoxide, methylcyclohexyl hydroperoxide, 2,4-dichlorobenzoyl peroxide, methyl ethyl ketone peroxide, cyclohexanone peroxide, cumene hydroperoxide, diisopropylbenzene hydroperoxide, paramenthane hydroperoxide, isopropyl percarbonate, etc. The organic peroxy compounds constituted a preferred class of catalyst for use in this invention. Mixtures of peroxy compound catalysts may be employed or the peroxy compound catalysts may be utilized in admixture with various diluents as catalysts for the process of this invention. Thus organic peroxy compounds which are compounded commercially with various diluents for use as free radical generating catalysts may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl phthalate, methyl ethyl ketone peroxide in dimethylphthalate, cyclohexanone peroxide with dibutyl phthalate, acetyl peroxide in dimethylphthalate, etc. Only catalytic amounts (less than stoichiometric amounts) need be used in the process.

The condensation of the polyhaloalkanes and particularly polychloroalkanes with the cyclic triene is particularly illustrated by the following equation:

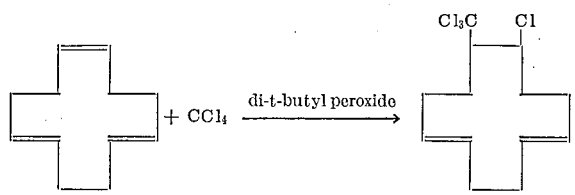

in which one molecular proportion of 1,5,9-cyclododecatriene is condensed with one molecular proportion of carbon tetrachloride in the presence of an organic peroxide catalyst such as di-t-butyl peroxide.

The process of this invention may be carried out in a batch type operation by placing a quantity of the cyclic triene and the free radical generating catalyst in a reactor equipped with a mixing device, adding the polyhaloalkane, heating to a preselected reaction temperature while mixing the contents of the reactor, cooling after a suitable period of time, and recovering the condensation products.

The preferred method of operation is of the continuous type. In this method of operation the cyclic triene, the polyhaloalkane, and the catalyst are continuously charged to a reactor maintained at suitable conditions of temperature and pressure. The reactor may be an unpacked vessel or coil, or it may contain an adsorbent packing material such as fire brick, alumina, dehydrated bauxite and the like. The condensation products are separated from the reactor effluent, and the unconverted starting materials may be recycled to the reaction zone. The unreacted materials are lower boiling than the condensation products and thus are readily recoverable by conventional means such as fractionation for purposes of recycle. In the continuous method of carrying out this process, the reactants are added continuously to the reaction zone, but if desired, they may be added intermittently.

In selecting a particular reaction temperature for use in the process of the present invention, two considerations must be taken into account. First, sufficient energy by means of heat must be applied to the reaction system so that the reactants, namely, the selected cyclic triene and polyhaloalkane, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-tert-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitable activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular temperature needed for any particular catalyst. Generally the operating temperature does not exceed the temperature at which the half life is not more than 10 hours by more than about 150° C. since free radical generating catalysts decompose rapidly under such conditions. However, in some instances temperatures as high as 300° C. may be utilized, for example, when a reactor is charged with the desired polyhaloalkane and the free radical generating catalyst in a solution in the desired cyclic triene is introduced under and by means of pressure as a liquid under the surface of the polyhaloalkane maintained at the high temperature. The half life of tert-butyl perbenzoate is less than 10 hours at about 110° C., and accordingly when this peroxy compound is used as the catalyst for this process, the operating temperature is from about 110° to about 300° C. but generally not greater than about 265° C. An operating temperature of from about 130° to about 300° C. is used with a di-tert-butyl peroxide, and from about 75° to about 300° C. but generally not greater than about 225° C. with benzoyl peroxide. Little advantage is gained if the temperature is too high even though the reactants tend to become more activated in the presence of the free radical generating catalyst decomposing at a high rate since decomposition of the polyhaloalkane takes place at temperatures above about 300° C.

Although pressures of up to 100 atmospheres may be utilized, the reaction preferably takes place in liquid phase and thus the pressure will preferably range from about atmospheric to about 100 atmospheres such that a substantial proportion of the reactants is in the liquid phase. Pressure is not an important variable in the process of this invention. However, because of the low boiling points of some of the reactants, it is necessary to utilize pressure withstanding equipment to insure liquid phase conditions. In batch type operations it is often desirable to utilize pressure withstanding equipment to charge the reactants and catalyst to the vessel, and to pressure the vessel with 10, 30 or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Nitrogen is also conveniently utilized when a glass liner is used along with pressure withstanding equipment. Since the nitrogen is pressured into the vessel prior to heating, it tends to maintain the reactants within the glass liner and thus aids in their removal after the passage of the desired period of time at the reaction temperature selected.

The concentration of the catalyst employed in this process may vary over a rather wide range but for reasons of economy it is desirable to use low concentrations of catalyst, such as from about 0.1% to about 10% of the total weight of the polyhaloalkane and cyclic triene charged to the process. The reaction time may be within the range of less than one minute to several hours, depending upon temperature and half life of the free radical generating catalyst, as set forth hereinabove. Generally, contact time of at least 10 minutes are preferred.

The particular polyhaloalkane and the nonconjugated cyclic triene which comprise the starting materials of the present invention are usually present in the reaction mixture in an amount ranging from about 0.5:1 to about 10:1 molecular proportions of polyhaloalkane per molecular proportion of non-conjugated cyclic triene. The amount of polyhaloalkane which is present will be dependent upon whether or not the desired product will comprise a cyclic alkadiene, cyclic alkene or cyclic alkane. For example, when one molecular proportion of chloroform is condensed with one molecular proportion of 1,5,9-cyclododecatriene, the resulting product comprises 9-chloro - 10 - (trichloromethyl)-1,5-cyclodecadiene; when two molecular proportions of chloroform are condensed with one molecular proportion of the cyclic triene the resulting product will comprise chiefly 5,9-dichloro-6,10-di-(trichloromethyl)-1-cyclododecene; and when three molecular proportions of chloroform are condensed with a molecular proportion of the triene, the resulting product will comprise 1,5,9-trichloro-2,6,10-tri-(trichloromethyl) dodecane.

Examples of compounds which may be prepared according to the present invention comprise 9-chloro-10-(trichloromethyl)-1,5-cyclododecadiene,
9-chloro-10-(dichloromethyl)-1,5-cyclododecadiene,
9-chloro-10-(1,1-dichloroethyl)-5,9-cyclodecadiene,
9-chloro-10-(1,1-dichlorobutyl)-5,9-cyclodecadiene,
5,9-dichloro-6,10-di-(trichloromethyl)-1-cyclododecene,
6,10-dichloro-5,9-di-(trichloromethyl)-1-cyclododecene,
5,9-dichloro-6,10-di-(dichloromethyl)-1-cyclododecene,
5,9-dichloro-6,10-di-(1,1-dichloroethyl)-1-cyclododecene,
5,9-dichloro-6,10-di-(1,1-dichlorobutyl)-1-cyclododecene,
1,5,9-trichloro-2,6,10-tri-(trichloromethyl)cyclododecane,
1,5,9-trichloro-2,6,10-tri-(dichloromethyl)cyclododecane,
1,5,9-trichloro-2,6,10-tri-(1,1-dichloroethyl)cyclododecane,
1,5,9-trichloro-2,6,10-tri-(1,1-dichlorobutyl)cyclododecane, etc.

It is to be understood that the aforementioned compounds are only representatives of the class of compounds which may be prepared and that the present invention is not necessarily limited thereto.

The following examples are given to illustrate the process of the present invention which, however, are not intended to limit the generally broad scope of the present invention in strict accordance therewith.

*Example I*

A solution of 10 grams of di-t-butyl peroxide, 75 grams of carbon tetrachloride and 85 grams of 1,5,9-cyclododecatriene was placed in the glass liner of a rotating autoclave. The autoclave was sealed and nitrogen pressed in until an initial pressure of 30 atmospheres had been reached. The autoclave and contents thereof were heated to a temperature of about 130° C. and maintained at a range of from about 130° to about 140° C. for a period of about 5.4 hours. Following this time the autoclave was allowed to cool to room temperature, the excess pressure of 30 atmospheres was vented and the reaction product was recovered. The reaction product was subjected to fractional distillation under reduced pressure. There was recovered about 45 grams of product boiling chiefly at 170° to 172° C. at 2.3 mm. pressure, said product having a refraction index $n_D^{21}$ of 1.5426. In addition, there was obtained a higher boiling residue comprising an amber solid material.

*Example II*

In this experiment an excess of carbon tetrachloride was present by placing a solution comprising 53 grams of 1,5,9-cyclododecatriene, 195 grams of carbon tetrachloride and 8 grams of di-t-butyl peroxide in the glass liner of a rotating autoclave. The autoclave was sealed and nitrogen pressed in until an initial pressure of 30 atmospheres was reached. The autoclave was then heated to a temperature of about 130° C. and maintained in a range of from about 130° to 140° C. for a period of about 5 hours, the pressure reaching a maximum of 50 atmospheres at this temperature. At the end of the reaction time the autoclave and contents thereof were allowed to cool to room temperature, the final pressure being 30 atmospheres. The excess pressure was vented and the product comprising 247 grams was recovered and subjected to fractional distillation under reduced pressure. The cuts having a boiling point of from 166° to 174° C. at 1.9–2.5 mm. pressure and comprising chiefly 9 - chloro - 10-(trichloromethyl)-1,5-cyclododecadiene was separated and recovered in 40% yield. Higher boiling, more highly chlorinated, product was also obtained but not isolated in pure form.

*Example III*

In this example a solution comprising a molecular proportion of chloroform and a molecular proportion of 1,5,9-cyclododecatriene along with a free radical generating catalyst comprising di-t-butyl peroxide is placed in the glass liner of a rotating autoclave. The autoclave is then sealed and nitrogen pressed in until an initial pressure of 30 atmospheres is reached. The autoclave is then heated to a temperature of about 130° C. and maintained in a range of from about 130° to about 140° C. for a period of about 5 hours. At the end of this time the autoclave and contents thereof are allowed to cool to room temperature, the excess pressure is vented and the reaction product is taken up with pentane and subjected to fractional distillation under reduced pressure. The cut comprising 9 - chloro - 10-dichloromethyl-1,5-cyclododecadiene is separated and recovered.

*Example IV*

A solution comprising one molecular proportion of 1,1,1-trichloroethane, 1 molecular proportion of 1,5,9-cyclododecatriene and a catalyst comprising t-butyl perbenzoate is treated in a manner similar to that in the above examples, that is, the autoclave is sealed, pressured with nitrogen and heated to a temperature of about 110° C. The autoclave is maintained at a temperature in the range of from about 110° to about 120° C. for a period of about 5 hours, at the end of which time the autoclave is cooled to room temperature, the excess pressure is vented and the reaction product subjected to fractional distillation under reduced pressure. The desired product comprising 9-chloro-10-(1,1-dichloroethyl)-1,5-cyclododecadiene is separated and recovered.

*Example V*

A solution comprising one molecular proportion of 1,1,1-trichloropropane, one molecular proportion of 1,5,9-cyclododecatriene along with a catalyst comprising di-t-butyl peroxide is placed in the glass liner of a rotating autoclave. The autoclave is sealed, nitrogen pressed in until an initial pressure of 30 atmospheres is reached and then heated to a temperature of from about 130° to about 140° C. for a period of about 5 hours. At the end of this time the reaction product is recovered in a manner similar to that set forth in the above examples and subjected to fractional distillation under reduced pressure, the desired product comprising 9-chloro-10-(1,1-dichloropropyl)-1,5 - cyclododecadiene being separated and recovered.

Example VI

A solution comprising one molecular proportion of hexachloroethane and one molecular proportion of 1,5,9-cyclododecatriene along with a catalytic amount of di-t-butyl peroxide is placed in the glass liner of a rotating autoclave which is thereafter sealed, pressed with nitrogen and heated to a temperature of about 130° C. The autoclave and contents thereof are maintained at a temperature in the range of from about 130° to about 140° C. for a period of about 5 hours following which the autoclave is cooled to room temperature, the excess pressure is vented and the reaction product recovered. The reaction product after treatment similar to that hereinabove set forth, is subjected to fractional distillation under reduced pressure and the desired 9-chloro-10-(pentachloroethyl)-1,5-cyclododecadiene is separated and recovered.

I claim as my invention:

1. A 9 - halo - 10-(polyhaloalkyl)-1,5-cyclododecadiene in which the halogen atoms are selected from the group consisting of chlorine and bromine.
2. 9 - chloro - 10-(trichloromethyl)-1,5-cyclododecadiene.
3. 9 - chloro - 10 - (dichloromethyl)-1,5-cyclododecadiene.
4. 9 - chloro - 10-(1,1-dichloroethyl)-1,5-cyclododecadiene.
5. 9 - chloro - 10-(1,1-dichloropropyl)-1,5-cyclododecadiene.
6. 9 - chloro - 10 - (pentachloroethyl)-1,5-cyclododecadiene.

References Cited by the Examiner

UNITED STATES PATENTS

| | | | |
|---|---|---|---|
| 2,436,058 | 2/1948 | Schmerling | 260—648 |
| 2,921,097 | 1/1960 | Feichlinger et al. | 260—648 |
| 3,007,974 | 11/1961 | Lippincott | 260—648 |
| 3,025,329 | 3/1962 | Gleason | 260—648 |

OTHER REFERENCES

Israelashvili et al.: J. Chem. Soc. (London), 1951, pp. 3261–3265.

Kharasch et al.: J. Org. Chem., 14 (1949), pp. 239–247.

LEON ZITVER, *Primary Examiner.*